Figure 1:
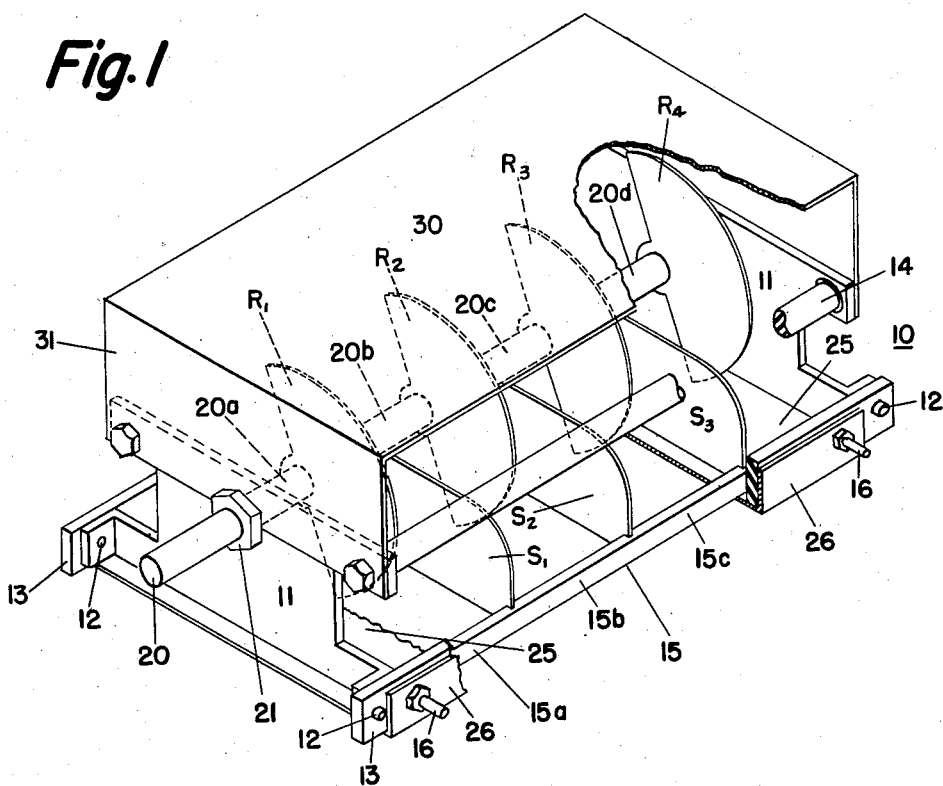

Feb. 25, 1958  R. V. BUGGY  2,824,966

HIGH FREQUENCY RESONANT CIRCUIT

Filed March 16, 1956

INVENTOR.
RODMAN V. BUGGY

BY George Sipkin

ATTORNEY

United States Patent Office 2,824,966
Patented Feb. 25, 1958

2,824,966

HIGH FREQUENCY RESONANT CIRCUIT

Rodman V. Buggy, Philadelphia, Pa.

Application March 16, 1956, Serial No. 572,168

1 Claim. (Cl. 250—40)

(Granted under Title 35, U. S. Code (1952), sec. 266)

The invention described herein may be manufactured and used by or for the Government of the United States of America for governmental purposes without the payment of any royalties thereon or therefor.

This invention relates to high frequency resonant circuits and in particular to such circuits employing a variable capacitor as the tuning element.

The invention is applicable to variable capacitors having a stator assembly formed of metal plates which are arranged in parallel relationship within a frame which in turn supports a shaft arranged to mount a rotor assembly of parallel metal plates. The rotor plates are positioned between the plates of the stator so that rotation of the shaft effects a variation in the extent of meshing between the stator and rotor plates. The frame structure of conventional capacitors provides the electrical connection to the stator plates while the shaft provides the connection to the rotor plates.

It is known that when a capacitor of the above generally described type is operated at high frequency, the stator and frame are generally short-circuited and the principal inductance in the capacitor resides in self-inductance of the rotor shaft, and consequently the highest obtainable frequency is restricted. In addition, the voltage developed at resonance becomes extremely non-uniform. This non-uniformity is caused by the fact that the reactance of the capacitor is no longer a lumped constant but acts more in the nature of a transmission line.

The conventional type of variable capacitor is therefore not suitable for high power operation at very high frequencies because high power involves a high voltage between the stator and the rotor which necessitates increasing the spacing between the various plates which would require an extremely bulky capacitor with resultant increased self-inductance.

Accordingly, the broad object of the present invention is to reduce the internal self-inductance of a variable capacitor in order that it may be used as the tuning element in resonant circuits at very high frequencies. Another and collateral object is to provide a variable capacitor which may be compactly constructed to handle greater power at a given high frequency.

Specifically, the invention contemplates the provision of a conductive and inherently very small inductive shunt member preferably of copper and of substantial area for making contact with and bridging the ends of the rotor shaft, and a similar copper plate of substantial area for making contact with and bridging the ends of the stator assembly of a variable capacitor. The shunts are arranged about the frame to, in effect, provide a housing for the frame and to enclose the stator and rotor plates.

Another object of the invention then is to construct a capacitor with upper and lower inductor shunts of similar design which may be used selectively as a support for the capacitor assembly. By the provision of inductor shunts of substantial area a single closed circuit is provided for each group of stator and rotor plates forming the capacitors.

Figure 2:
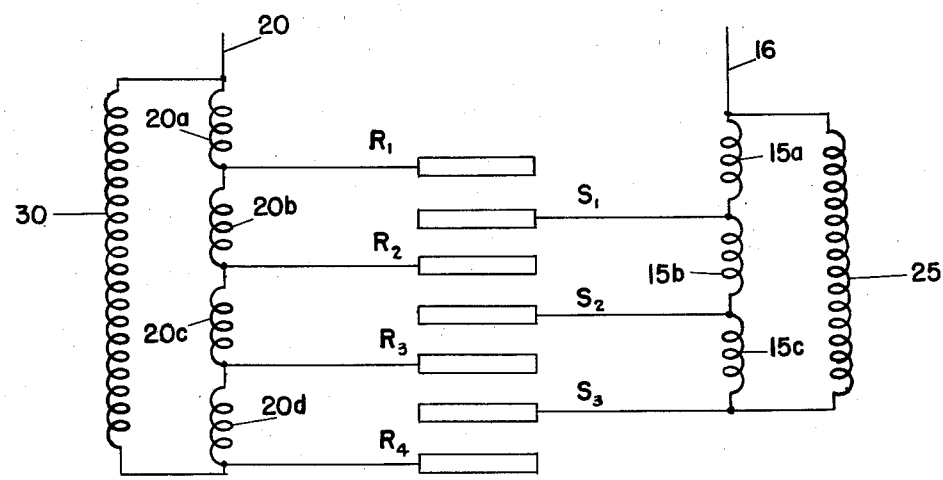

Other objects and advantages of the invention will hereinafter become more fully apparent from the following description of the annexed drawings, which illustrate a preferred embodiment, and wherein:

Fig. 1 is a view in perspective of a conventional capacitor provided with top and bottom inductor shunts; and Fig. 2 is a schematic showing of the electrical circuit corresponding to the structure of Fig. 1.

The capacitor of Fig. 1 comprises the usual rectangular frame indicated generally at 10 which is made up of end uprights 11—11 joined at their lower ends by bolt connections 12 to side rails 13—13 which are formed of insulating material. The uprights 11 are interconnected at their upper ends by side rods 14 and provide rigidity to the frame structure.

The stator side of the capacitor comprises a plurality of plates represented by $S_1$, $S_2$, and $S_3$ which are fixed in side conductors 15 and are secured to the insulated rails 13 by connecting bolts 16 providing an inherent inductance path from any of these bolts through the conductors 15 and plates $S_1$, $S_2$ and $S_3$.

The rotor side of the capacitor comprises the shaft 20 which is rotatably mounted in the uprights 11 by a suitable rotatable bearing arrangement 21. The rotor plates are indicated at $R_1$, $R_2$, $R_3$, and $R_4$ and are fixed to the shaft 20 to be rotatable therewith.

The stator and rotor sides of the capacitor are assembled with the several plates arranged in interdigitating relation so that the capacitance of the assembly may be varied by rotation of the shaft 20 to vary the degree of intermeshing between the rotor plates $R_1$, $R_2$, $R_3$ and $R_4$ with the fixed stator plates $S_1$, $S_2$ and $S_3$.

In order to reduce the effect of the inherent inductance, there is provided a metal inductor shunt 25 and a generally similar shunt 30 constructed of sheet material, such as copper, for each of the stator and rotor sides of the capacitor. As shown in Fig. 1, the shunts are of a size to cover the top and bottom frame and shunt 25 is provided with upstanding flanges 26 which are fixed to the insulated side rails 13 to provide a supporting base for the capacitor assembly. The shunt 30 is provided with depending flanges 31 which are secured by rods 14 to the frame and provides a cover for the assembly. Since the shunts 25 and 30 are thus securely fixed to the frame 10, the complete capacitor assembly provides a rigid structure which may be reversibly supported on its top or bottom portions.

Referring to Fig. 2, the resonant current flow on the stator side is from connecting bolt 16 at the lower left of the frame to the conductor 15 which physically receives the plates $S_1$, $S_2$ and $S_3$ of the stator. The conductor 15 may be considered to form inductor segments 15a, 15b and 15c respectively between the connecting bolt 16 and the end plate $S_3$.

The resonant current flow on the rotor side is from the left end of shaft 20 through the shaft and rotor plates $R_1$, $R_2$, $R_3$ and $R_4$ of the rotor. The rotor shaft may be considered to provide inductor segments 20a, 20b, 20c and 20d respectively between the end of shaft 20 and the end plate $R_4$.

By the provision of the inductor shunts 25 and 30 the inherent inductance of a capacitor is reduced in value since the inductances of these added shunts effectively parallel the distributed or inherent inductances of the rotor and stator plates of the capacitor. The thickness of the shunts 25 and 30 is such as to provide low resistance paths and yet sufficient to provide the mechanical strength to support the other capacitor structure.

Obviously many modifications and variations of the present invention are possible in the light of the above teachings. It is therefore to be understood that within the scope of the appended claim the invention may be practiced otherwise than as specifically described.

What is claimed is:

In a high frequency resonant circuit comprising a capacitor having side and end walls forming a frame, a row of spaced vertical stator plates disposed within the frame and parallel to its end walls, a conductor strip extending along one side wall of the frame and in contact with each of said spaced stator plates providing a conductor therefor, a shaft mounting a row of vertically spaced rotor plates in interdigitating relation with the stator plates and providing a conductor therefor, said conductor strip and said rotatable shaft forming inherent inductor segments between the stator plates and the rotor plates respectively, an upper plate having depending end flanges supporting the shaft at its ends and being in conductive relation therewith, a lower plate secured to the frame and in conducting relationship with said conductor strip, said upper and lower plates being substantially coextensive with the frame providing an enclosure for the rotor and stator plates and also forming shunt paths which parallel the shaft inductor segments and the conductor strip inductor segments whereby the inherent inductance in the rotor and stator structure is materially reduced.

References Cited in the file of this patent

UNITED STATES PATENTS

| | | |
|---|---|---|
| 1,478,342 | Lewis | Dec. 18, 1923 |
| 1,557,725 | Proctor | Oct. 20, 1925 |
| 1,746,411 | Baeckler | Feb. 11, 1930 |
| 2,492,748 | Hibberd | Dec. 27, 1949 |
| 2,557,969 | Isely | June 26, 1951 |
| 2,725,348 | Dreyer | Nov. 8, 1955 |